(12) United States Patent
Wynn et al.

(10) Patent No.: US 6,945,265 B2
(45) Date of Patent: Sep. 20, 2005

(54) REGULATOR WITH MULTIPLE FLOW DIFFUSERS

(75) Inventors: James Wynn, Virginia Beach, VA (US); Jason T. Kilgore, Newport News, VA (US); Markus Kopetzky, Neutraubling (DE)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 246 days.

(21) Appl. No.: 10/454,776

(22) Filed: Jun. 5, 2003

(65) Prior Publication Data

US 2004/0069349 A1 Apr. 15, 2004

Related U.S. Application Data

(60) Provisional application No. 60/386,618, filed on Jun. 6, 2002.

(51) Int. Cl.[7] .............................................. G05D 16/02
(52) U.S. Cl. ......................... 137/12; 137/508; 123/459
(58) Field of Search .......................... 137/12, 508, 509, 137/510; 123/459

(56) References Cited

U.S. PATENT DOCUMENTS

| 5,180,139 A | 1/1993 | Gethmann et al. | .......... | 251/127 |
|---|---|---|---|---|
| 5,778,926 A | * 7/1998 | Tanaka et al. | .............. | 137/508 |
| 5,901,742 A | * 5/1999 | Kleppner et al. | ........... | 137/508 |
| 6,782,871 B2 | * 8/2004 | McIntyre et al. | ........... | 123/457 |

FOREIGN PATENT DOCUMENTS

| DE | 195 48 167 A1 | 6/1997 | .......... | F02M/59/46 |
|---|---|---|---|---|
| EP | 1 106 821 A2 | 6/2001 | .......... | F02M/69/54 |

OTHER PUBLICATIONS

International Search Report; International Application No. PCT/US03/17858; date completed, Sep. 18, 2003.

* cited by examiner

Primary Examiner—Stephen M. Hepperle

(57) ABSTRACT

A flow-through pressure regulator includes a retainer that secures a diaphragm relative to a seat, and includes an intermediate portion, an end portion and a base portion. The intermediate portion extends along a longitudinal axis and is fixed with respect to the seat. The end portion extends from the intermediate portion and includes a concave surface facing the seat. The regulator includes multiple flow diffusers such that the end portion includes at least one aperture having a flow axis that is oblique to the longitudinal axis so as to reduce noise due to fluid flow and/or the seat forms a passage having an increasing cross-sectional area from an inlet to an outlet.

20 Claims, 1 Drawing Sheet

REGULATOR WITH MULTIPLE FLOW DIFFUSERS

CLAIM OF BENEFIT OF PRIORITY APPLICATION

This application claims the benefit under 35 U.S.C. § 119 of U.S. Provisional application No. 60/386,618, filed 6 Jun. 2002, which is incorporated by reference herein in its entirety.

FIELD OF THE INVENTION

This invention relates to a pressure regulator for automotive fuel systems, and more particularly to a flow through pressure regulator having a diffuser to reduce flow noise.

BACKGROUND OF THE INVENTION

Most modern automotive fuel systems utilize fuel injectors to deliver fuel to the engine cylinders for combustion. The fuel injectors are mounted on a fuel rail to which fuel is supplied by a pump. The pressure at which the fuel is supplied to the fuel rail must be controlled to ensure the proper operation of the fuel injectors. Pressure is controlled using pressure regulators that control the pressure of the fuel in the system at all engine r.p.m. levels.

Fuel flow rate through known pressure regulators tends to be low at high engine speed, as large quantities of fuel are consumed in the combustion process. At low engine speeds, less fuel is consumed in combustion and flow rates through the pressure regulators are high. These high fuel flow rates can produce unacceptably high noise and pressure levels.

A known pressure regulator includes a divider having a seat, a diaphragm and a retainer. The divider separates a housing into a first chamber and a second chamber. The seat defines a passage extending along a longitudinal axis of the housing between the first and second chambers. The seat includes a first portion proximate the first chamber having a first cross-sectional area and a second portion proximate the second chamber and having a second cross-sectional area. The first cross-sectional area is greater than the second cross-sectional area. The diaphragm extends between the housing and the seat. The retainer includes a plurality of apertures having a flow axis oriented along the longitudinal axis. The apertures diffuse flow and reduce operational noise of the regulator.

It is believed that there is a need for a pressure regulator that reduces flow-related noise at high fuel flow rates more than the known pressure regulator, while still being inexpensive to manufacture.

SUMMARY OF THE INVENTION

The preferred embodiment provides a flow-through pressure regulator having at least one of multiple flow diffusers. The flow-through pressure regulator includes a housing that has an inlet and an outlet that is disposed along a longitudinal axis, a divider that separates the housing into a first chamber and a second chamber, and a closure member. The divider includes a seat, a diaphragm, a retainer and a flow diffuser. The seat defines a passage between the first and second chambers, and the diaphragm extends between the housing and the seat. The retainer secures the diaphragm relative to the seat, and includes an intermediate portion, an end portion and a base portion. The intermediate portion extends along the longitudinal axis from the base portion, and the end portion extends from the intermediate portion. The end portion includes at least one aperture having a flow axis. The aperture permits fluid communication between the passage and the second chamber. The flow diffuser may include the passage having an increasing cross-sectional area in a direction from the inlet to the outlet along the longitudinal axis. The flow diffuser may include the flow axis of the aperture being oblique to the longitudinal axis. The flow diffuser may include the passage having an increasing cross-sectional area in a direction from the inlet to the outlet along the longitudinal axis, and the flow axis of the aperture being oblique to the longitudinal axis. The closure member may be arranged relative to the seat between a first configuration that substantially prevents fluid communication through the passage and a second configuration that permits fluid communication through the passage.

The present invention also provides a method of diffusing fluid flow through a pressure regulator. The pressure regulator may include a divider having a seat, a diaphragm and a retainer. The retainer may include a plurality of apertures. The divider separates a housing into a first chamber and a second chamber. The housing has a longitudinal axis, and the seat defines a passage extending along the longitudinal axis between the first and second chambers. The seat may include a first portion proximate the first chamber having a first cross-sectional area and a second portion proximate the second chamber having a second cross-sectional area. The diaphragm may extend between the housing and the seat. The method includes flowing the fluid through the passage with the first cross-sectional area being less than the second cross-sectional area. The method further includes flowing the fluid through one of the apertures along an axis oblique to the longitudinal axis.

BRIEF DESCRIPTION OF THE DRAWINGS

The accompanying drawing, which is incorporated herein and constitutes part of this specification, illustrates the presently preferred embodiment of the invention, and, together with the general description given above and the detailed description given below, serves to explain features of the invention.

The FIGURE illustrates a flow-through regulator according to a preferred embodiment.

DETAILED DESCRIPTION OF THE PREFERRED EMBODIMENTS

Figure 1:
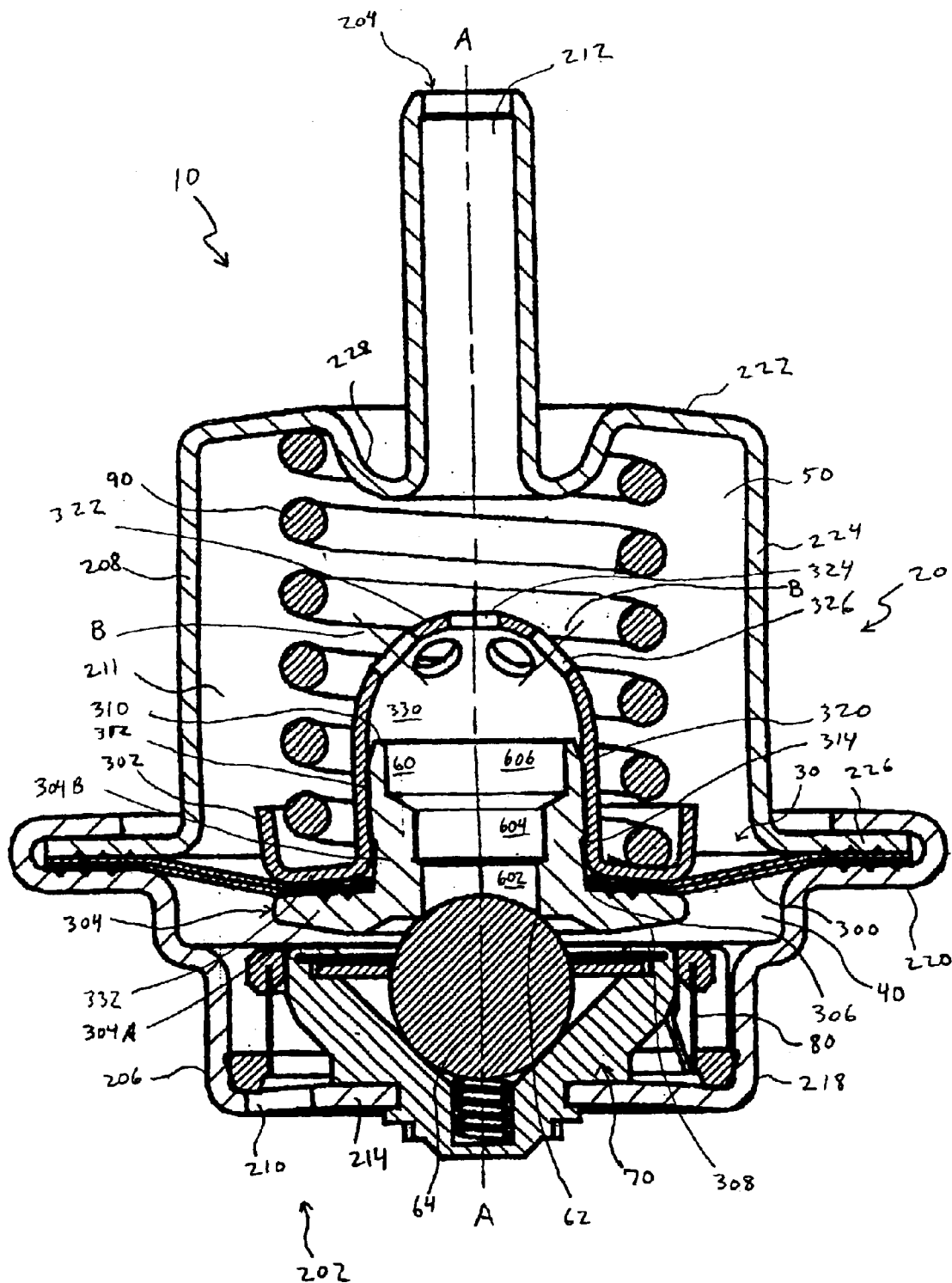

The FIGURE illustrates a flow-through pressure regulator 10 according to a preferred embodiment. The flow-through pressure regulator 10 includes a housing 20. The housing 20 is separated by a divider 30 into a first chamber 40 and a second chamber 50. The divider 30 has a passage 60 that communicates the first chamber 40 with the second chamber 50. A closure member 70 permits or inhibits flow through the passage 60. A filter 80 may be disposed in the flow path of the housing 20. The housing 20 has an inlet 202 and an outlet 204 offset along a longitudinal axis A—A. The housing 20 can include a first housing part 206 and a second housing part 208 that are crimped together to form a unitary housing 20 with a hollow interior 211. Although the unitary housing is formed by two joined members, it is to be understood that the unitary housing could be formed with multiple members integrated together or, alternatively, a monolithic member. The inlet 202 of the housing 20 is located in the first housing part 206, and the outlet 204 of the housing 20 is located in the second housing part 208. The inlet 202 can be a plurality of apertures 210 located in the first housing part 206. The outlet 204 can be a port 212 disposed in the second housing part 208.

The first housing part 206 can include a first base 214, a first lateral wall 218 extending in a first direction along the longitudinal axis A—A from the first base 214, and a first flange 220 extending from the first lateral wall 218 in a direction substantially transverse to the longitudinal axis A—A. The second housing part 208 can include a second base 222, a second lateral wall 224 extending in a second direction along the longitudinal axis A—A from the second base 222, and a second flange 226 extending from the second lateral wall 224 in a direction substantially transverse to the longitudinal axis A—A. The divider 30, which can include a diaphragm 300, is secured between the first flange 220 and the second flange 226 to separate the first chamber 40 and the second chamber 50. The first flange 220 can be rolled over the circumferential edge of the second flange 226 and can be crimped to the second flange 226 to form the unitary housing 20.

A first biasing element 90, which is preferably a spring, is located in the second chamber 50. The first biasing element 90 engages a locator 228 on the base 222 of the second housing part 208 and biases the divider 30 toward the base 214 of the first housing part 206. The first biasing element 90 biases the divider 30 of the regulator 10 at a predetermined force, which relates to the pressure desired for the regulator 10. The base 222 of the second housing part 208 has a dimpled center portion that provides the outlet port 212 in addition to the locator 228. The first end of the spring 90 is secured on the locator 228, while a second end of the spring 90 can be supported by a retainer 302, which is secured to a valve seat 304 mounted in a central aperture 306 in the diaphragm 300.

The flow-through pressure regulator 10 may include a flow diffuser. In a preferred embodiment, the flow diffuser may be the valve seat 304 forming the passage 60 such that passage 60 has an increasing cross-sectional area in a direction from the inlet 202 to the outlet 204 along the longitudinal axis A—A. In another preferred embodiment, the flow diffuser may be an aperture 326 having a flow axis B formed in the retainer 302 such that the flow axis B is oriented oblique to the longitudinal axis A—A. In yet another preferred embodiment, the flow diffuser may be the valve seat 304 forming the passage 60 such that passage 60 has an increasing cross-sectional area in a direction from the inlet 202 to the outlet 204 along the longitudinal axis A—A, and the aperture 326 having the flow axis B formed in the retainer 302 such that the flow axis B is oriented oblique to the longitudinal axis A—A.

In a preferred embodiment, the valve seat 304 is suspended by the diaphragm 300 in the housing 20, and provides the passage 60 that includes a first section 602 and a second section 604. The valve seat 304 has a first seat portion 304A and a second seat portion 304B disposed along the longitudinal axis A—A. The first seat portion 304A is disposed in the first chamber 40 and the second seat portion 304B is disposed in the second chamber 50. The first section 602 of the passage 60 extends along the longitudinal axis A—A in both the first portion 304A and the second portion 304B of the valve seat 304. The second section 604, which also extends along the longitudinal axis A—A, is in the second portion 304B of the valve seat 304. In a preferred embodiment, passage 60 may include additional sections, for example section 606.

The valve seat 304 preferably has a first surface 308 disposed in the first chamber 40, a second surface 310 disposed in the second chamber 50, and a side surface 312 extending between the first surface 308 and the second surface 310. The first section 602 of the passage 60 communicates with the first surface 308. The second section 604 of the passage 60 communicates with the first section 602 and the second surface 310. The first section 602 has a first cross-sectional area and the second section 604 has a second cross-sectional area that is larger than the first cross-sectional area. In a preferred embodiment, the first and second cross-sections are circular, the first cross-section having a first diameter or approximately 4.5 mm and the second cross-section having a second diameter of approximately 5.2 mm.

The side surface 312 of the valve seat 304 may include an undercut edge 314 that may enhance the press-fitted connection between the retainer 302 and the valve seat 304.

It should be noted that the valve seat 304 of a preferred embodiment can be a monolithic valve seat or, alternatively, separate components that can be assembled.

At an end of the passage 60 opposite the second seat surface 310 is a seating surface 62 for seating the closure member 70, which can be a valve actuator ball 64. In the manufacturing of the valve seat 304, the seating surface 62 is finished to assure a smooth sealing surface for the ball 64.

In a preferred embodiment, the retainer 302 includes an intermediate portion 320 in the form of a cylinder that extends along the longitudinal axis A—A. It is to be understood, however that, intermediate portion 320 could be in the form of other geometric shapes known in the art. According to a preferred embodiment, an inner surface of the intermediate portion 320 is press-fitted with respect to the side surface 312 of the seat 304, and may cooperatively engage the undercut edge 314.

The retainer 302 also includes an end portion 322 that extends from the intermediate portion 320. In a preferred embodiment, the end portion 322 includes a concave surface facing the seat. In a preferred embodiment, the concave surface is in the form of a portion of a sphere. It is to be understood, however, that the end portion 322 could include any geometric surface known in the art, such as a conical surface, a flat surface, a rectangular surface, and/or any polyhedral surface. In a preferred embodiment, the end portion 322 is integrally formed with the intermediate portion 320. For example, the end portion 322 and the intermediate portion 320 may be formed of a flat sheet of metal that is stamped into form. Of course, it is to be understood that the end portion 322 and the intermediate portion 320 may be formed separately and joined. The intermediate portion 320 and the end portion 322 form a chamber 330 in fluid communication with the passage 60 described above, and the plurality of apertures 324,326 described below.

The end portion 322 includes a plurality of apertures 324,326. The plurality of apertures 324,326 may be stamped in the end portion 322 while end portion 322, and integral intermediate portion 320, are in the flat condition. In a preferred embodiment, at least one aperture 326 has a flow axis B oriented oblique to the longitudinal axis A—A. Aperture 324 may have a flow axis concentric with the longitudinal axis A—A. In a preferred embodiment, the end portion 326 includes a plurality of apertures 326 each having a respective flow axis oriented oblique to the longitudinal axis A—A, and intersecting the longitudinal axis A—A at a common point. Apertures 324,326 permit fluid communication between the passage 60 and the second chamber 50.

According to an exemplary preferred embodiment with seven apertures, a first aperture 324 is located concentrically with respect to the longitudinal axis A—A. The six remaining apertures 326 are formed in a circular pattern centered about the longitudinal axis A—A such that each respective axis is oblique to the longitudinal axis A—A. According to a most preferred embodiment, each of the apertures 324,326 has a diameter of 1.59±0.02 millimeters, and six apertures 326 are evenly spaced, i.e., every 60°, about the longitudinal axis A—A. Additionally, a preferred ratio of the longitudinal thickness of the end portion 322 to the diameter of the apertures 324,326 is approximately 0.35.

In a preferred embodiment, the retainer 302 also includes a base portion 332 that extends from the intermediate portion 320 in a generally radially outward direction relative to the longitudinal axis A—A. The base portion 332 is disposed along the longitudinal axis A—A from the end portion 322 and, in cooperation with the first seat portion 304A, sandwiches the diaphragm 300, thereby coupling the diaphragm 300 to the valve seat 304. The base portion 332 also serves to support and to locate the second end of the spring 90 with respect to the divider 30. In a preferred embodiment, the base portion 332 is formed in substantially the same stamping operation and from the same sheet of metal as the intermediate portion 320 and the end portion 322.

The noise and flow characteristics through the pressure regulator 10 are improved by the oblique orientation of apertures 326. Providing a collection chamber 330 in the fluid flow between the passage 60 and the apertures 324,326 also improves the noise and flow characteristics through the pressure regulator 10. Moreover, providing passage 60 with portions having increasing cross-sectional areas, such as first section 602 and second section 604, also improves the noise and flow characteristics through the pressure regulator 10. These features can be used independently or in combination to provide a multiple flow diffuser.

One method of assembling the fuel regulator 10 is by coupling, such as by staking or press-fitting, the closure member 70 to the first housing part 206. The divider 30 is assembled by locating the valve seat 304 in the central aperture 306 of the diaphragm 300, and then press-fitting the retainer 302 with respect to the seat 304 such that the side surface 312 contiguously engages the intermediate portion 320. The assembled divider 30 is located with respect to the upper flange surface 220 of the first housing part 206. The bias spring 90 is positioned in the retainer 302 and the second housing part 208 is then placed over the spring 90. The flange 220 of the first housing part 206 is crimped down to secure the second housing part 208. The first and second housing parts 206,208 and the diaphragm 300 form the first and second chambers 40,50, respectively. The pressure at which the fuel is maintained is determined by the spring force of the bias spring 90.

The operation of the pressure regulator and a method of diffusing fluid flow through the pressure regulator will now be described. The bias spring 90 acts through the retainer 302 to bias the divider 30 toward the base 214 of the first housing part 206. When the ball 64 is seated against surface 62, the pressure regulator 10 is in a closed configuration and no fluid can pass through the pressure regulator 10.

Fluid enters the pressure regulator 10 through apertures 210 and exerts pressure on the divider 30. When the pressure of the fluid is greater than the force exerted by the bias spring 90, the diaphragm 300 moves in an axial direction and the ball 64 leaves the seating surface 62 of the valve seat member 304. This is the open configuration of the pressure regulator 10. Fluid can then flow through the regulator 10. From the first chamber 40, the fluid enters the first section 602 of the passage 60, and then passes into the second section 604, having a larger cross-sectional area than first section 602, before entering the collection chamber 330. From the collection chamber 330, the fluid passes through the aperture 324 in the direction of the longitudinal axis A—A into the second chamber 50, and fluid passes through apertures 326 in directions oblique to the longitudinal axis A—A, before leaving the pressure regulator through the outlet 204.

As the incoming fuel pressure is reduced, the force of the bias spring 90 overcomes the fuel pressure and returns the valve seat member 304 to seated engagement with the ball 64, thus closing the passage 60 and returning the pressure regulator to the closed configuration.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A flow-through pressure regulator, comprising:
    a housing having an inlet and an outlet disposed along a longitudinal axis;
    a divider separating the housing into a first chamber and a second chamber, the divider including:
        a seat defining a passage between the first and second chambers;
        a diaphragm extending between the housing and the seat;
        a retainer securing the diaphragm to the seat, the retainer including:
            a base portion proximate the seat;
            an intermediate portion extending along the longitudinal axis from the base portion toward the outlet; and
            an end portion extending from the intermediate portion, the end portion including at least one aperture, the at least one aperture having a flow axis, the at least one aperture permitting fluid communication between the passage and the second chamber; and
        a flow diffuser including at least one of (1) an increasing cross-sectional area of the passage in a direction from the inlet to the outlet along the longitudinal axis; and (2) an oblique orientation of the flow axis of the at least one aperture to the longitudinal axis; and
    a closure member being arranged between first and second configurations relative to the seat, the first configuration substantially preventing fluid communication through the passage, and the second configuration permitting fluid communication through the passage.

2. The flow-through pressure regulator of claim 1, wherein the flow diffuser comprises an increasing cross-sectional area of the passage in a direction from the inlet to the outlet along the longitudinal axis.

3. The flow-through pressure regulator of claim 2, wherein the passage comprises first and second portions, the first portion includes a first cross-section orthogonal to the longitudinal axis, and the second portion includes a second cross-section orthogonal to the longitudinal axis, the first portion being located between the second portion and the inlet, the second portion being located between the first portion and the outlet, and the first cross-section being smaller than the second cross-section.

4. The flow-through pressure regulator of claim 3, wherein the first cross-section is substantially circular and has a diameter of approximately 4.5 millimeters and the second cross-section is substantially circular and has a diameter of approximately 5.2 millimeters.

5. The flow-through pressure regulator of claim 1, wherein the flow diffuser comprises an oblique orientation of the flow axis of the at least one aperture to the longitudinal axis.

6. The flow-through pressure regulator of claim 5, wherein the at least one aperture comprises a plurality of apertures.

7. The flow-through pressure regulator of claim 6, wherein the end portion includes a concave surface facing the seat, the plurality of apertures forming a pattern on the concave surface.

8. The flow-through pressure regulator of claim 7, wherein the pattern of apertures is centered about the longitudinal axis.

9. The flow-through pressure regulator of claim 8, wherein the pattern of apertures comprises a portion of a sphere.

10. The flow-through pressure regulator of claim 9, wherein the plurality of apertures consists of seven apertures, the flow axis of one of the seven apertures being concentric with the longitudinal axis, and each of the respective flow axis of the other of seven apertures being oblique to the longitudinal axis.

11. The flow-through pressure regulator of claim 10, wherein the each of the respective flow axis of the other of seven apertures intersect the longitudinal axis at a common point.

12. The flow-through pressure regulator of claim 1, wherein the flow diffuser comprises:
   an increasing cross-sectional area of the passage in a direction from the inlet to the outlet along the longitudinal axis; and
   an oblique orientation of the flow axis of the at least one aperture to the longitudinal axis.

13. The flow-through pressure regulator of claim 1, wherein the seat, the intermediate portion, and a longitudinal gap between the seat and the end portion of the retainer define a collection chamber in fluid communication between the passage and the apertures.

14. The flow-through pressure regulator of claim 13, wherein the flow diffuser comprises an increasing cross-sectional area of the passage in a direction from the inlet to the outlet along the longitudinal axis.

15. The flow-through pressure regulator of claim 13, wherein the flow diffuser comprises an oblique orientation of the flow axis of the at least one aperture to the longitudinal axis.

16. The flow-through pressure regulator of claim 1, comprising:
   a resilient element extending along the longitudinal axis and biasing the divider toward the closure member,
   wherein the housing includes first and second housing parts, the first housing part including the inlet and defining the first chamber, and the second housing part including the outlet and defining the second chamber,
   wherein the diaphragm includes a first perimeter sandwiched between the first and second housing parts,
   wherein the base portion includes an annular portion extending outwardly from the intermediate portion relative to the longitudinal axis,
   wherein the diaphragm includes a second perimeter being sandwiched between the seat and the annular portion, and
   wherein the resilient element includes a first end engaging the second housing part and a second end engaging the annular portion.

17. A method of diffusing fluid flow through a pressure regulator, the pressure regulator including a divider, the divider including a seat, a diaphragm and a retainer, the retainer having a plurality of apertures, the divider separating a housing into a first chamber and a second chamber, the housing having a longitudinal axis, the seat defining a passage extending along the longitudinal axis between the first and second chambers, the seat including a first portion proximate the first chamber having a first cross-sectional area and a second portion proximate the second chamber and having a second cross-sectional area, and the diaphragm extending between the housing and the seat, the method comprising:
   flowing the fluid through the passage with the first cross-sectional area being less than the second cross-sectional area; and
   flowing the fluid through a first one of the plurality of apertures along an axis oblique to the longitudinal axis.

18. The method of claim 17, further comprising:
   flowing the fluid through a second one of the plurality of apertures along the longitudinal axis.

19. The method of claim 18, further comprising:
   flowing the fluid through a third, fourth, fifth, sixth and seventh ones of the plurality of apertures along a respective axis oblique to the longitudinal axis.

20. The method of claim 17, further comprising:
   flowing the fluid from the passage through a collection chamber to the first one of the plurality of apertures.

* * * * *